US008924746B2

(12) United States Patent
Yamamoto

(10) Patent No.: US 8,924,746 B2
(45) Date of Patent: Dec. 30, 2014

(54) APPARATUS AND MEDIUM FOR ASSOCIATING DEVICE WITH SOCKET

(75) Inventor: Masatoshi Yamamoto, Kahoku (JP)

(73) Assignee: PFU Limited, Kahoku-shi (JP)

( * ) Notice: Subject to any disclaimer, the term of this patent is extended or adjusted under 35 U.S.C. 154(b) by 268 days.

(21) Appl. No.: 13/549,642

(22) Filed: Jul. 16, 2012

(65) Prior Publication Data

US 2013/0031384 A1    Jan. 31, 2013

(30) Foreign Application Priority Data

Jul. 28, 2011    (JP) .................................. 2011-165243

(51) Int. Cl.
| | |
|---|---|
| *G06F 1/00* | (2006.01) |
| *H02J 1/10* | (2006.01) |
| *H02J 3/14* | (2006.01) |
| *G08C 19/12* | (2006.01) |
| *G05B 11/01* | (2006.01) |
| *G05D 3/12* | (2006.01) |
| *G06F 15/173* | (2006.01) |
| *G06F 1/28* | (2006.01) |
| *H02J 13/00* | (2006.01) |

(52) U.S. Cl.
CPC ... *G06F 1/28* (2013.01); *H02J 3/14* (2013.01); *H02J 13/0062* (2013.01); *H02J 2003/143* (2013.01); *Y02B 70/3225* (2013.01); *Y02B 70/3266* (2013.01); *Y02B 90/2638* (2013.01); *Y04S 20/222* (2013.01); *Y04S 20/242* (2013.01); *Y04S 40/124* (2013.01)
USPC ............ 713/300; 307/29; 307/31; 340/13.23; 700/22; 700/291; 700/295; 709/223

(58) Field of Classification Search
CPC ............................... G06F 1/28; H02J 13/0062

USPC .................. 713/300; 307/29, 31; 340/13.23; 700/22, 291, 295; 710/223; 709/223
See application file for complete search history.

(56) References Cited

U.S. PATENT DOCUMENTS

| | | | | |
|---|---|---|---|---|
| 7,769,857 B2 * | 8/2010 | Chang et al. | ................... | 709/224 |
| 8,290,635 B2 * | 10/2012 | Cohen | ........................... | 700/295 |

(Continued)

FOREIGN PATENT DOCUMENTS

| | | |
|---|---|---|
| JP | 2004-23497 A | 1/2004 |
| JP | 3843894 B2 | 11/2006 |

(Continued)

OTHER PUBLICATIONS

Japanese Office Action dated Jun. 10, 2014, issued in corresponding Japanese Patent Application No. 2011-165243, w/English translation (7 pages).

*Primary Examiner* — Stefan Stoynov
(74) *Attorney, Agent, or Firm* — Westerman, Hattori, Daniels & Adrian, LLP

(57) ABSTRACT

The device management server is provided with a power consumption acquisition unit that acquires information relating to power consumption of each of a plurality of sockets; a communication unit that performs communication with an object device from among devices connected to a network in order to change power consumption of the object device; a socket specifying unit that specifies a socket in which power consumption has changed within a period of time relating to the communication on the basis of information acquired by the power consumption acquisition unit; and an association unit 24 that associates the object device with the socket specified by the socket specifying unit.

7 Claims, 9 Drawing Sheets

(56) References Cited

U.S. PATENT DOCUMENTS

| | | |
|---|---|---|
| 2008/0317021 A1 | 12/2008 | Ives et al. |
| 2009/0251127 A1* | 10/2009 | Kim .......................... 324/76.11 |
| 2010/0174419 A1* | 7/2010 | Brumfield et al. ............ 700/295 |
| 2010/0250440 A1* | 9/2010 | Wang et al. ..................... 705/63 |

FOREIGN PATENT DOCUMENTS

| | | |
|---|---|---|
| JP | 4321774 B2 | 8/2009 |
| JP | 2010-114967 A | 5/2010 |
| JP | 2010-531022 A | 9/2010 |
| JP | 2011-129026 A | 6/2011 |

* cited by examiner ated Japanese Patent Application No. JP2011-165243, filed on Jul. 28, 2011, the entire contents of which are incorporated herein by reference.

APPARATUS AND MEDIUM FOR ASSOCIATING DEVICE WITH SOCKET

CROSS-REFERENCE TO RELATED APPLICATION

This application is based upon and claims the benefit of priority of the prior Japanese Patent Application No. JP2011-165243, filed on Jul. 28, 2011, the entire contents of which are incorporated herein by reference.

FIELD

The present disclosure relates to device management.

BACKGROUND

A device management method has been suggested (see Japanese Patent Publication No. 4321774) that uses an electrical outlet that detects the activation of connected device and notifies a device management server of the installation place of the electrical outlet and the device management server that receives the activation notification from the device. When the notification is received from both the electrical outlet and the device within a predetermined time interval, the device connected to the electrical outlet is determined to be identical to the device relating to the activation notification.

Further, a variety of techniques have been suggested for transmitting the information relating to electrical outlets via a network (see Japanese Patent Publication No. 3843894 and Japanese Patent Application Publication Nos. 2004-23497 and 2010-114967).

SUMMARY

In accordance with the present disclosure, in order to resolve the abovementioned problems, a device with varying power consumption is specified on the basis of communication via a network, and this device is associated with a socket in which power consumption has changed in a period of time relating to the communication. Thus, the present disclosure provides a device management apparatus including: power consumption acquisition unit for acquiring information relating to power consumption of each of a plurality of sockets; communication unit for performing communication with an object device from among devices connected to a network in order to change power consumption of the object device; socket specifying unit for specifying a socket in which power consumption has changed within a period of time relating to the communication on the basis of information acquired by the power consumption acquisition unit; and association unit for associating the object device with the socket specified by the socket specifying unit.

The present disclosure also provides a device management apparatus including: power consumption acquisition unit for acquiring information relating to power consumption of each of a plurality of sockets; object device specifying unit for specifying an object device that performs communication accompanied by a change in power consumption by acquiring communication performed by a device connected to a network; socket specifying unit for specifying a socket in which power consumption has changed within a period of time relating to the communication on the basis of information acquired by the power consumption acquisition unit; and association unit for associating the object device with the socket specified by the socket specifying unit.

The present disclosure also provides a computer-readable non-transitory recording medium having stored therein a device management program for causing a computer to execute: acquiring information relating to power consumption of each of a plurality of sockets; performing communication with an object device from among devices connected to a network in order to change power consumption of the object device; specifying a socket in which power consumption has changed within a period of time relating to the communication on the basis of information acquired by the power consumption acquisition; and associating the object device with the socket specified by the socket specifying.

The present disclosure also provides a computer-readable non-transitory recording medium having stored therein a device management program for causing a computer to function as: acquiring information relating to power consumption of each of a plurality of sockets; specifying an object device that performs communication accompanied by a change in power consumption by acquiring communication performed by a device connected to a network; specifying a socket in which power consumption has changed within a period of time relating to the communication on the basis of information acquired by the power consumption acquisition; and associating the object device with the socket specified by the socket specifying.

DESCRIPTION OF EMBODIMENTS

A mode for carrying out the present disclosure in a device management system will be explained below with reference to the appended drawing. However, the present disclosure can be widely used with the object of associating a device with a socket to which the device is connected, and the application object of the present disclosure is not limited to the device management system explained hereinbelow.

<System Configuration>

Figure 1:
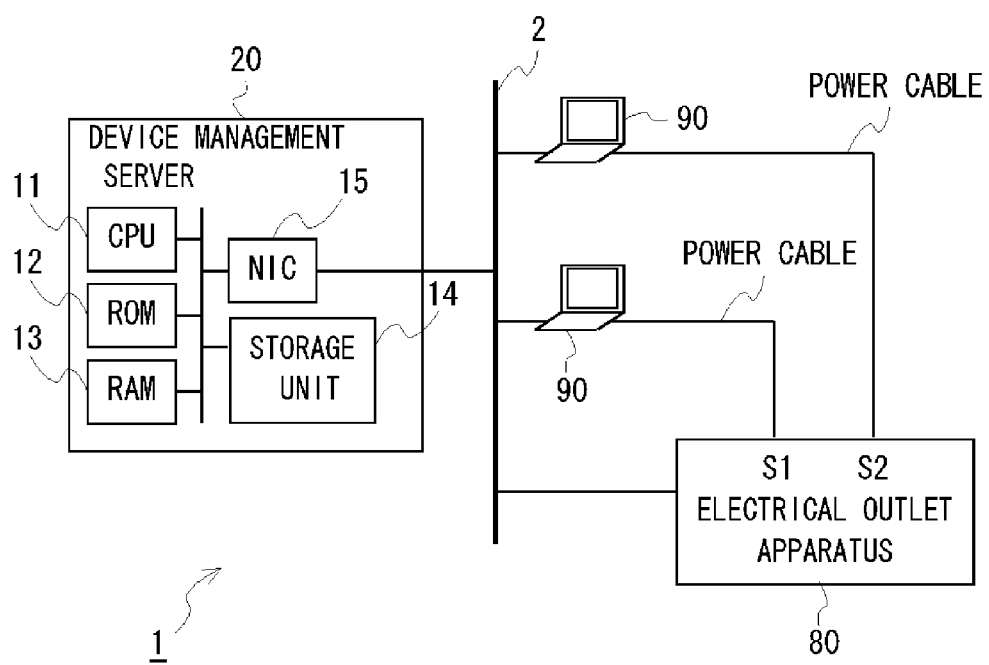
FIG. 1 is a schematic diagram illustrating the configuration of the device management system according to an embodiment.

FIG. 1 is a schematic diagram illustrating the configuration of the device management system 1 according to the present embodiment. The device management system 1 according to the present embodiment is provided with a network 2, a plurality of information processing devices 90 (referred to hereinbelow as "device 90") that is connected to the network 2 and serves as the management object, a device management server 20 that manages the device 90, and an electrical outlet apparatus 80 that provides for power supply to the device 90. The device 90 that is the management object includes, for example, PC (Personal Computers) and printers.

The device management server 20 is a computer provided with a CPU (Central Processing Unit) 11, a RAM (Random Access Memory) 13, a ROM (Read Only Memory) 12, a storage unit 14 such as an EEPROM (Electrically Erasable and Programmable Read Only Memory) or HDD (Hard Disk Drive), and a NIC (Network Interface Card) 15.

Figure 2:
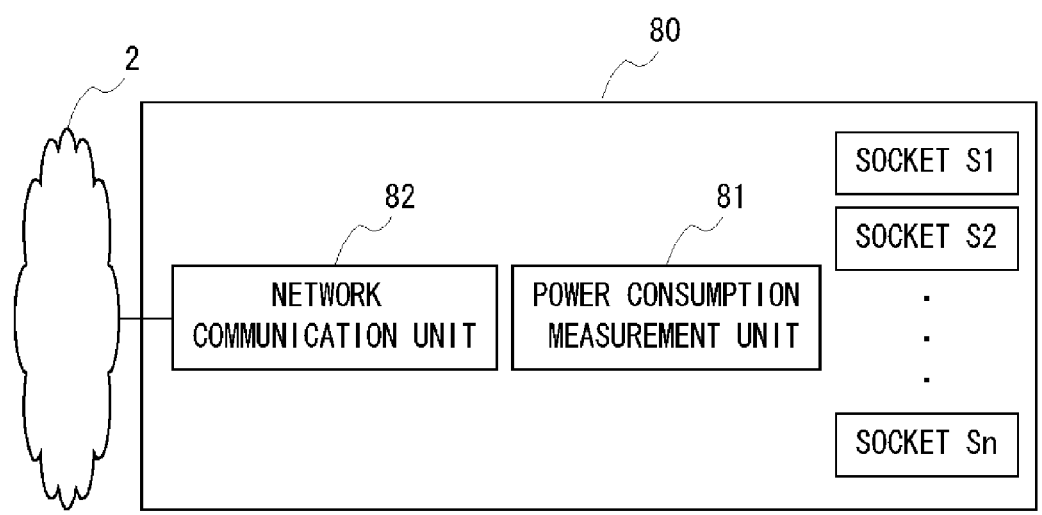
FIG. 2 illustrates schematically the configuration of the electrical outlet apparatus according to the embodiment.

FIG. 2 illustrates schematically the configuration of the electrical outlet apparatus 80 according to the present embodiment. The electrical outlet apparatus 80 is provided with a plurality of sockets that supplies power to the device that has been plugged in, a power consumption measurement unit 81 that measures the amount of power supplied from the sockets, and a network communication unit 82 that transmits the power consumption of each socket that has been measured by the power consumption measurement unit 81 to the network 2. Thus, the electrical outlet apparatus 80 according to the present embodiment is provided with a power consumption measurement unit 81 and the network communication unit 82, thereby providing additional functions to the usual electrical outlet. Further, in the present embodiment, the configuration into which the device is plugged in is called a socket, and the configuration in which one or a plurality of sockets is accommodated in a housing and which provides for power supply to one or a plurality of device is called the electrical outlet apparatus 80.

The power consumption measurement unit 81 measures the amount of power supplied from the socket, in order words, the power consumption of the device plugged in into the socket for each socket.

Upon receiving a power consumption request transmitted from the device management server 20, the network communication unit 82 transmits the power consumption of each socket measured by the power consumption measurement unit 81 and associated with the electrical outlet ID of the electrical outlet apparatus 80 and the socket ID of the socket relating to the request to the address of the device management server 20.

The electrical outlet ID is the identification information that can uniquely identify the electrical outlet at least in the network 2. In the present embodiment, the MAC address of the electrical outlet apparatus 80 is used as the electrical outlet ID. The socket ID is the identification information that can uniquely identify a socket at least in the electrical outlet apparatus 80 provided with the socket. In the present embodiment, socket numbers S1 to Sn that have been allocated to the sockets in the electrical outlet apparatus 80 are used as the socket ID.

Figure 3:
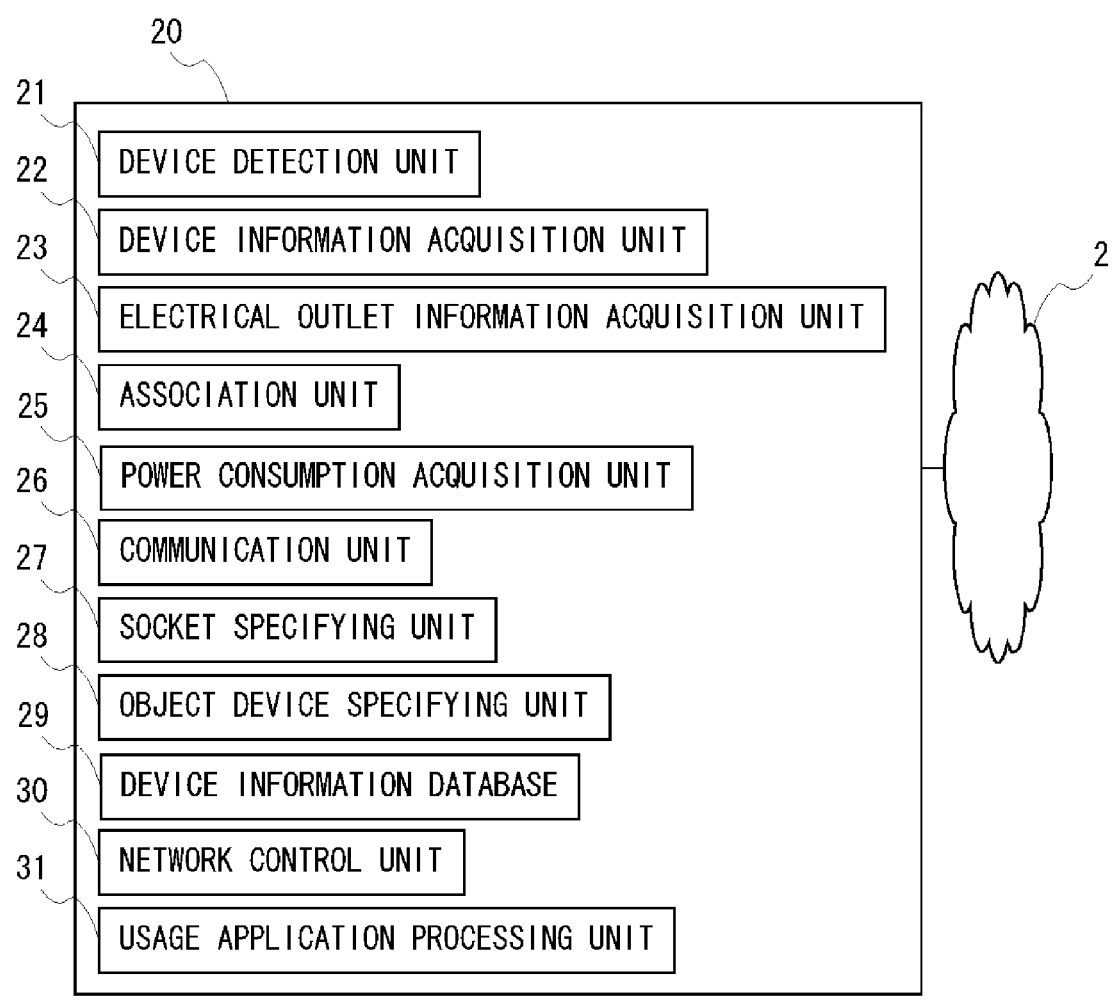
FIG. 3 illustrates schematically the functional configuration of the device management server according to the embodiment.

FIG. 3 illustrates schematically the functional configuration of the device management system 20 according to the present embodiment. By reading the program stored in the storage unit 14 to the RAM 13 and executing the program with the CPU 11, the device management system 20 functions as a device management system provided with a device detection unit 21, a device information acquisition unit 22, an electrical outlet information acquisition unit 23, an association unit 24, a power consumption acquisition unit 25, a communication unit 26, a socket specifying unit 27, an object device specifying unit 28, a device information database 29, a network control unit 30, and a usage application processing unit 31, and performs uniform management of device information and power consumption acquired from the electrical outlet apparatus 80. In the present embodiment, the functions of the device management system 20 are executed by the CPU 11, which is a general-purpose processor, but some or all of those functions may be also executed by one or a plurality of special-purpose processors.

The device detection unit 21 detects that a device has been connected to the network 2 and makes a record in the device information database 29 to the effect that the device has been connected. When the connected device is connected to the network 2 for the first time, the device detection unit 21 registers the information on the detected device in the device information database 29. The device registered in the device identification database 29 is identified using the device ID. In the present embodiment, a MAC address is used as the device ID. The device detection unit 21 detects the device connection by monitoring an ARP (Address Resolution Protocol) packet or monitoring a broadcast packet relating to a special protocol such as DNS or DHCP. The device detection unit 21 also detects the electrical outlet apparatus 80 as an information processing device that is the management object and uses the MAC address of the electrical outlet apparatus 80 as the power consumption ID (device ID relating to the power consumption apparatus 80).

The device information acquisition unit 22 uses a variety of means to acquire information on the device detected by the device detection unit 21 and stores the acquired information in the device information database 29. The device information can be acquired by SNMP (Simple Network Management Protocol), WMI (Windows® Management Instrumentation), broadcast packet analysis, or analysis (more specifically, HTTP header information of special protocol analysis) of communication introduced into the device management system 20 by APR spoofing. The device information may be also estimated on the basis of the acquired information. For example, the device type (PC, printer, electrical outlet apparatus 80, etc.) can be estimated on the basis of a port receiving the connection that has been specified by a word included in the acquired information or by port scanning relating to the device.

The APF spoofing performed herein is a technique for introducing communication transmitted from a device 90 into the device management system 20 by notifying the device 90 located on the network 2 of the MAC address (also referred to hereinbelow as "spoofing address") of the introduction destination, such as the device management system 20 or the like, as the MAC address of another terminal or route (not shown in the figure) in the network 2.

The electrical outlet information acquisition unit 23 uses the openly disclosed API (for example, SNMP or SOAP) of the electrical outlet apparatus 80 and acquires the electrical outlet information (device information on the electrical outlet apparatus 80) including the electrical outlet ID and the socket ID of the socket that belongs to the electrical outlet apparatus 80 from the electrical outlet apparatus 80. The acquired information is stored in the below-described device information database 29.

The association unit (device/electrical outlet apparatus linking unit) 24 associates (links) the device ID, electrical outlet ID, and socket ID and records the association in the device information database 29, thereby associating the device with the electrical outlet apparatus 80 and socket used by the device.

The power consumption acquisition unit 25 uses the openly disclosed API (for example, SNMP or SOAP) of the electrical outlet apparatus 80, and acquires the power consumption of the designated socket from the electrical outlet apparatus 80 provided with the socket. The acquired power consumption is stored in the below-described device information database 29.

The communication unit 26 performs communication with the selected object device, from among the device connected to the network 2, in order to change the power consumption of the device. For example, communication for applying a load to the device can be used to change the power consumption of the device. Examples of such communication include continuous transmission of packets, a printing instruction to a printer, and an activation instruction to the object device. Further, the communication for applying a load to the device may be communication for instructing a linkage function that has been installed in advance in the device and changes the power consumption of the device upon reception of the communication. Examples of such communication include communication for instructing a load adjusting function of the CPU, communication for setting a power save mode, and communication for instructing a disk access control function.

The socket specifying unit 27 specifies a socket for which the power consumption has changed in a period of time relating to communication on the basis of the information acquired by the power consumption acquisition unit 25.

The object device specifying unit 28 specifies the device for which the communication accompanied by the change in power consumption has been performed by acquiring the communication performed by the device connected to the network 2. In this case, examples of communication for specifying the object device include communication for sending a printing instruction to a printer, communication generated when the device is connected to the network 2 (ARP), and usual communication between two units in the network 2.

The device information database 29 stores the device information. The database stores the IP address of the device, device type, and other information associated with the device ID (in the present embodiment, the MAC address of the device) for uniquely identifying the device.

In the present embodiment, the electrical outlet apparatus 80 is also handled as an information processing apparatus that is the object of management. Therefore, for this purpose, the electrical outlet information is stored as the device information in the device information database 29, and the device information relating to the device 90 and the electrical outlet information relating to the electrical outlet apparatus 80 (device information on the electrical outlet apparatus 80) are managed in the device information database 29 in an integrated manner. When the electrical outlet information is stored as the device information, the information indicating that the device is an electrical outlet apparatus is stored as the device type, and the socket ID of the socket of the electrical outlet apparatus and the power consumption per unit time for each socket are stored in other information.

In another embodiment, the electrical outlet information may be managed in a database (for example, electrical outlet information database) different from the device information database 29.

<Processing Flow>

The flow of processing executed by the device management system 1 according to the present embodiment will be explained below by using sequence diagrams and flowcharts. The specific contents of the processing and processing sequence explained hereinbelow are examples for carrying out the present disclosure. The specific processing contents and processing sequence may be selected as appropriate according to the embodiments of the present disclosure.

Figure 4:
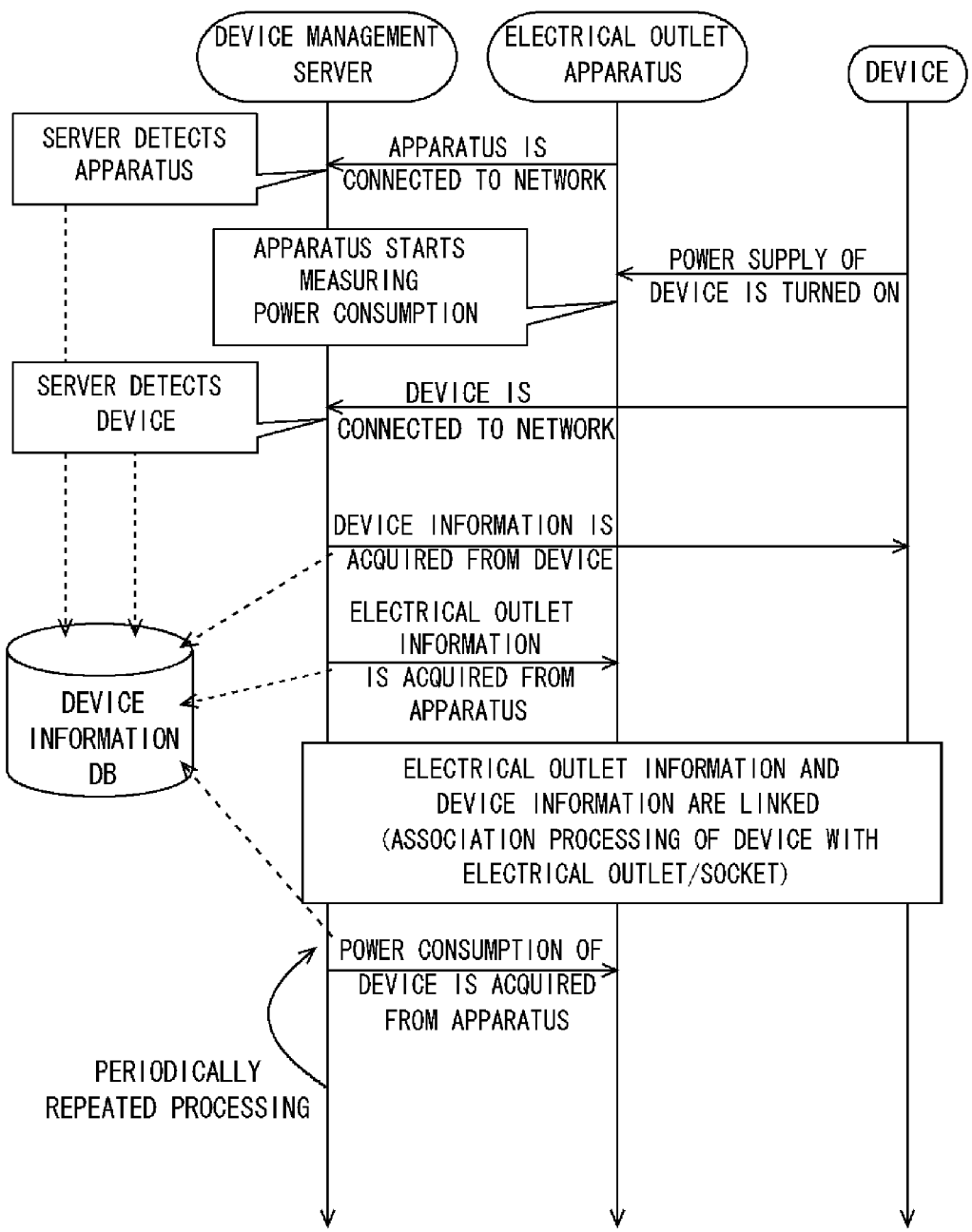
FIG. 4 is a sequence diagram illustrating the flow of device management processing according to the embodiment.

FIG. 4 is a sequence diagram illustrating the flow of device management processing according to the present embodiment. In the device management processing, where the electrical outlet apparatus 80 is connected to the network 2, the device detection unit 21 of the device management server 20 detects the electrical outlet apparatus 80 and registers the electrical outlet apparatus in the device information database 29. The detection of the electrical outlet apparatus 80 by the device management server 20 may be performed according to the request transmitted from the electrical outlet apparatus 80 to the address of the device management server 20 or may be performed by detecting another communication (ARP or the like) carried out by the electrical outlet apparatus 80 with the device management server 20.

The electrical outlet apparatus 80 also measures, as mentioned hereinabove, the power consumption for each socket. Thus, where the power supply of the device connected to the socket of the electrical outlet apparatus 80 (in other words, the device to which power is supplied from the electrical outlet apparatus 80) is turned on, the electrical outlet apparatus 80 measures the total amount of power from the sockets to the device, thereby measuring the power consumption of the device. The electrical outlet information acquisition unit 23 of the device management server 20 acquires the electrical outlet information from the electrical outlet apparatus 80 via the network 2 and stores the acquired information in the device information database 29. The electrical outlet information includes the power consumption for each socket provided at the electrical outlet apparatus 80.

Where power supply of the device connected to the network 2 is turned on and the device communicate in the network 2, the device detection unit 21 of the device management server 20 detects the communication performed by the device. Further, the device information acquisition unit 22 of the device management server 20 acquires the device ID that can identify the individual device 90 that belongs to the network 2, from among the detected devices, and stores the acquired device ID in the device information database 29. In the present embodiment, the MAC address of the device 90 is used as the device ID. The device detection unit 21 of the device management server 20 acquires all of the packets flowing in the network 2, including those that by themselves have no MAC address, thereby acquiring broadcast packets such as the address resolution request of ARP transmitted by the device 90 and acquiring the MAC address of the device 90.

More specifically, the device detection unit 21 of the device management server 20 acquires all of the packets flowing in the network 2, including those that by themselves have no MAC address, and compares the MAC address of the transmission sources of the acquired packets with the MAC address stored in the device information database 29. Where the comparison result indicates that the MAC address of the transmission source of the acquired packets is not included in the device information database 29, the device detection unit 21 determines that a new device 90 has been connected to the network 2 and acquires the MAC address and IP address of the new device 90.

By performing the association processing, the association unit 24 of the device management server 20 associates the electrical outlet and socket with the device connected to the electrical outlet and socket on the basis of the device information acquired from the device and power consumption acquired from the electrical outlet apparatus 80. The association processing executed herein will be explained below in detail with reference to FIG. 5 to FIG. 7.

Then, the power consumption acquisition unit 25 of the device management server 20 periodically (for example, every minute) acquires the power consumption from the electrical outlet apparatus 80 and stores the acquired power consumption as the power consumption of the device corresponding to the electrical outlet in the device information database 29. Since this processing is executed periodically, data relating to power consumption for each device that can be uniquely identified by the device ID is stored in the device information database 29. With the device management system 1 of the present embodiment, it is thus possible to determine accurately the power consumption of each piece of device that has been uniquely specified, and the information obtained can be used to improve the state of ecology and reduce cost.

The association processing according to the present embodiment will be explained below with reference to FIG. 5 to FIG. 7. In the present embodiment, any of the following three association processing operations can be executed: (1) association processing based on network access to the device; (2) association processing based on network access from the device; and (3) association processing based on the user's input. Any of the association processing operations of the above-mentioned types (1) to (3) may be executed individually, or a combination of two or more association processing operations may be executed. For example, the association processing of types (1) and (2) can be complemented by executing "(3) association processing based on the user's input" after the automatic association processing of types (1) and (2).

Figure 5:
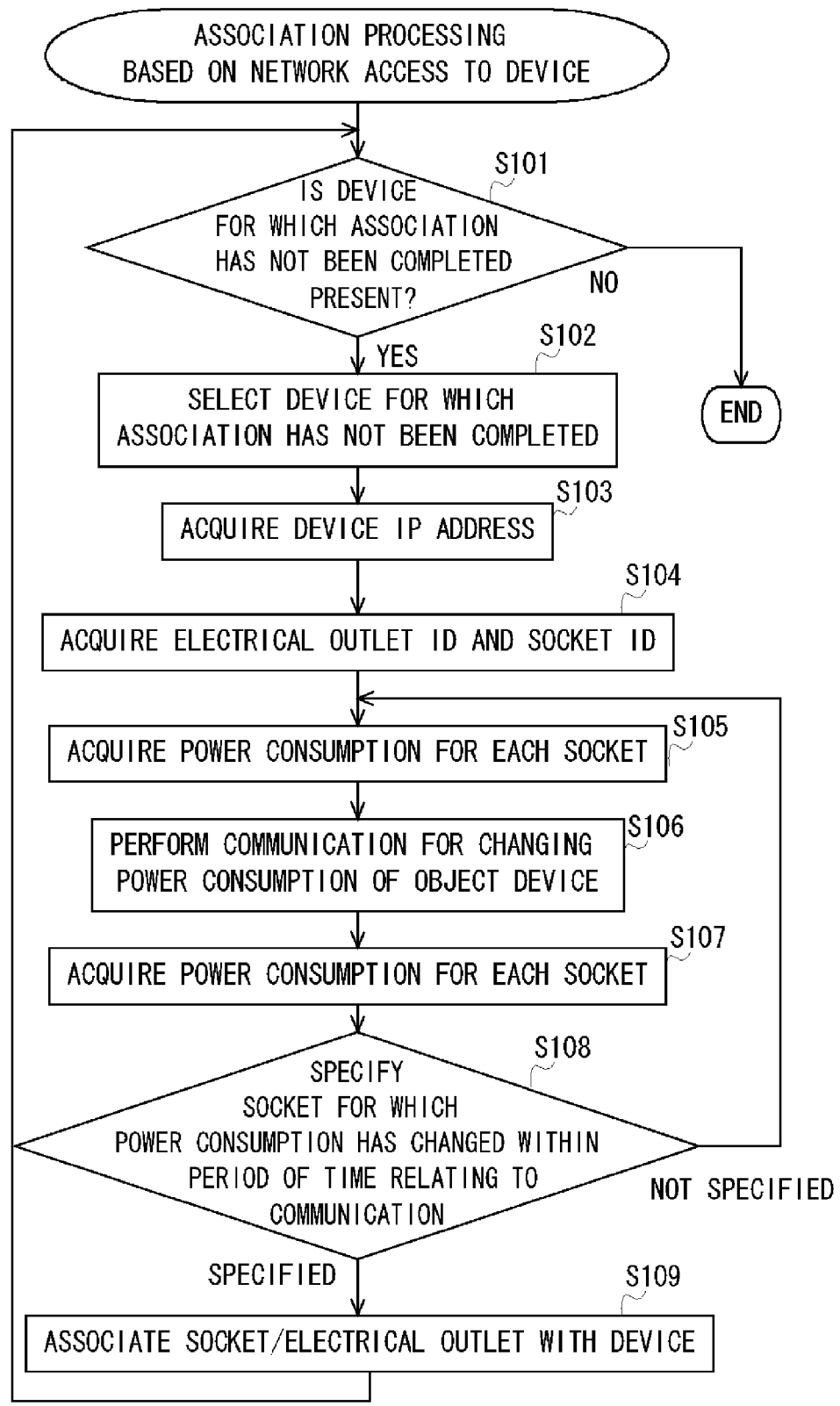
FIG. 5 is a flowchart illustrating the flow of association processing based on network access to the device according to the embodiment.

FIG. 5 is a flowchart illustrating the flow of association processing based on network access to the device according to the present embodiment. The present flowchart serves to explain in greater detail the association processing illustrated by FIG. 4.

In step S101, it is determined whether or not the device for which the association has not been completed is present. The device management server 20 refers to the device information database 29 and determines whether or not the device for which the electrical outlet ID and socket ID of the electrical outlet apparatus and socket used by the device has not been clarified is present among the device for which the device information has been stored (that is, the device for which the association of the socket and electrical outlet with the device has not been completed). When the device for which the association has not been completed is not present, in other words, when the electrical outlet ID and socket ID have been clarified for the entire device having the device information, the processing illustrated by the present flowchart ends. However, where the device for which the association has not been completed is present, the processing advances to step S102.

In step S102 and step S103, the device for which the association has not been completed is selected and the IP address of the device is acquired. The device that is selected and is the object of the association processing with the socket will be referred to hereinbelow as "object device". The device management server 20 selects the device for which the association has not been completed as the object device from the device information database 29 (step S102), and acquires the IP address of the object device from the device information database 29 (step S103). The processing then advances to step S104.

In step S104, the electrical outlet ID and socket ID are acquired. The device management server 20 acquires all of the electrical outlet ID and socket ID of the sockets that belong to the electrical outlet apparatus 80 of the same subnet as the IP address of the object device. The IP address of the electrical outlet apparatus 80 to be used for determining whether the subnet is the same is acquired from the device information database 29. However, it is also possible to acquire all of the socket ID recorded in the device information database 29, without checking whether the subnet is the same. The processing then advances to step S105.

In step S105, the power consumption of each socket is acquired. The power consumption acquisition unit 25 acquires the newest power consumption of the socket relating to the electrical outlet ID and socket ID that have been acquired in step S104 from the device information database 29 or from the electrical outlet apparatus 80. When the newest power consumption is acquired from the electrical outlet apparatus 80, the device management server 20 transmits a power consumption request to the electrical outlet apparatus to which the socket belongs. The processing then advances to step S106.

In step S106, communication is performed with the object device for changing the power consumption of the object device. The communication unit 26 performs communication for changing the power consumption of the object device with the IP address (IP address of the object device) that has been acquired in step S103. Examples of communication for changing the power consumption of the object device include: (1) continuous access to a well-known port in a protocol corresponding to the port; (2) continuous acquisition of device information; (3) printing instruction to a printer; and (4) power supply operation via a network.

For example, when the HTTP access is received in the object device (Web server operates), the HTTP access (access to port No. 80) can be performed continuously as the aforementioned "(1) continuous access to a well-known port in a protocol corresponding to the port".

Further, for example, when a SNMP manager operates in the object device, the MIB (Management Information Base) acquisition can be continuously performed as the aforementioned "(2) continuous acquisition of device information".

When a device type of the object device obtained from device information is a printer, a printing instruction of small volume or blank page is issued to the printer, and the sleep mode of the printer is canceled and warm-up is performed as the aforementioned "(3) printing instruction to a printer".

Further, for example, when the power supply of the object device is OFF, the power supply of the object device is set ON by transmitting a WakeOnLAN package to the object device as the aforementioned "(4) power supply operation via a network". The power supply operation via a network may be the operation of setting OFF the power supply of the object device via the network 2.

The communication performed in the present step may be the communication for changing the power consumption of the object device or may be communication other than the communication presented by way of specific example herein. The processing then advances to step S107.

In step S107, the power consumption for each socket is acquired. The power consumption acquisition unit 25 acquires the newest power consumption of the socket relating to the socket ID that has been acquired in step S104 from the device information database 29 or from the electrical outlet apparatus 80 in parallel with executing the processing described in step S106. The processing then advances to step S108.

In step S108, the socket in which the power consumption has changed within a period of rime relating to the communication is specified on the basis of the power consumption information. The socket specifying unit 27 specifies the socket in which the power consumption has been observed to change correspondingly to the contents of the communication within a period in which the communication of step S106 has been performed by comparing the power consumption acquired in step S105 and the power consumption acquired in step S107 for each socket. Thus, when the communication in step S106 is the communication for increasing the power consumption, a socket with increased power consumption is specified. Meanwhile, where the communication in step S106 is the communication for decreasing the power consumption, a socket with decreased power consumption is specified.

In the case where no socket has been specified, the processing advances to step S105. Thus, in the processing illustrated by the present flowchart, the processing of steps S105 to S108 is repeated till the socket corresponding to the object device selected in step S102 is specified. Meanwhile, where the socket is specified, the processing advances to step S109.

In step S109 the socket and electrical outlet are associated with the device. The association unit 24 associates the electrical outlet ID and socket ID of the socket specified in step S108 with the device ID of the object device selected in step S102. More specifically, the association unit 24 associates the object device, electrical outlet apparatus 80, and socket by recording the electrical outlet ID and socket ID of the corresponding socket in a record for each piece of device in the device information database 29.

The processing then advances to step S101. Thus, in the processing illustrated by the present flowchart, the processing of steps S101 to S109 is repeated till the association with the sockets is completed for the entire device stored in the device information database 29.

Figure 6:
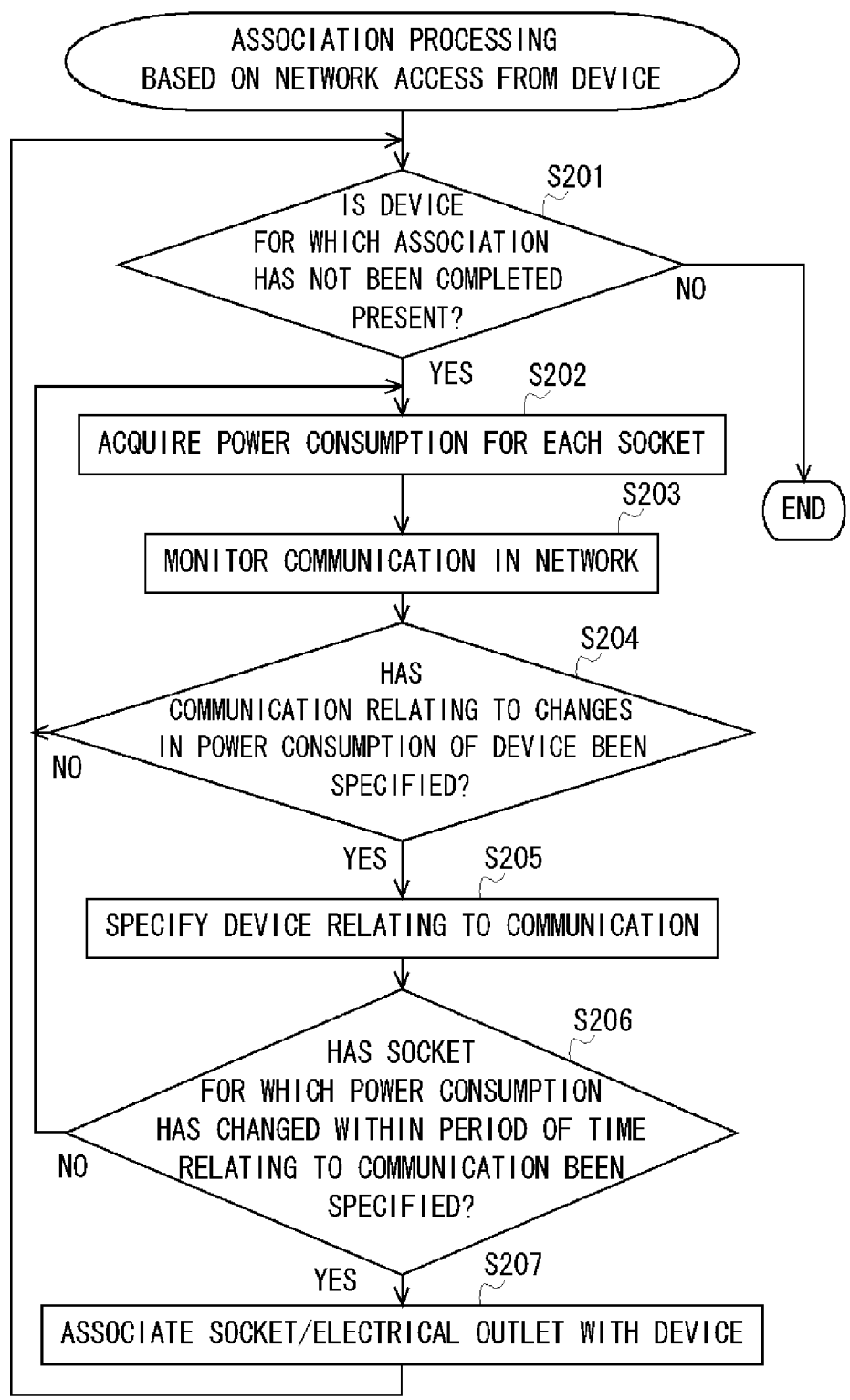
FIG. 6 is a flowchart illustrating the flow of association processing based on network access from the device according to the embodiment.

FIG. 6 is a flowchart illustrating the flow of association processing based on network access from the device according to the present embodiment. The present flowchart serves to explain in greater detail the association processing illustrated by FIG. 4.

In step S201, it is determined whether or not the device for which the association has not been completed is present. The details of this processing are same as those of the processing explained in step S101 illustrated by FIG. 5 and therefore the explanation thereof is omitted. When the device for which the association has not been completed is not present, the processing illustrated by the present flowchart ends. However, where the device for which the association has not been completed is present, the processing advances to step S202.

In step S202, the power consumption of each socket is acquired. The power consumption acquisition unit 25 periodically acquires the newest power consumption of all of the sockets for which the electrical outlet ID and socket ID has been recorded in the device information database 29 from the device information database 29 or from the electrical outlet apparatus 80. When the newest power consumption is acquired from the electrical outlet apparatus 80, the device management server 20 transmits a power consumption request to the electrical outlet apparatus to which the socket belongs. The processing then advances to step S203.

In step S203 and step S204, the communication in the network 2 is monitored and the communication relating to changes in power consumption of the device is specified. The object device specifying unit 28 acquires (captures) all of the packets flowing in the network 2, including those without the own MAC address (step S203). The object device specifying unit 28 determines whether or not the captured packet is a packet of a specific type, or whether or not the captured packet relates to a protocol of a specific type, thereby specifying the communication relating to changes in power consumption of a certain device in the network 2 from among the communication acquired in step S203 (step S204).

For example, when a packet transmitted following the connection of device in a network, such as an ARP packet and DNS or DHCP broadcast packets, is present among the packets acquired in step S203, the object device specifying unit 28 determines that the power supply of the device indicated in the transmission source address of the packet has been turned on (power is consumed and power consumption increases substantially from zero) and specifies this communication as communication relating to changes in the power consumption of the device.

Further, where a packet relating to a printing protocol is present among the packets acquired in step S203, the object device specifying unit 28 determines that power consumption of the device (printer) indicated in the packet destination increases and specifies this communication as communication relating to changes in the power consumption of the device.

The object device specifying unit 28 in accordance with the present disclosure may also capture a packet on a network 2 by inducing the communication in the device management server 20 by ARP spoofing.

Where the communication relating to changes in the power consumption of the device has not been specified, the processing advances to step S202. Thus, in the processing illustrated by the present flowchart, the processing of steps S202 to S204 is repeated till the communication relating to changes in the power consumption of the device is specified. Meanwhile, where the communication relating to changes in the power consumption of the device has been specified, the processing advances to step S205.

In step S205, the device relating to communication is specified. The object device specifying unit 28 specifies the device relating to communication with respect to the communication that has been acquired in step S203 and specified in step S204 as the communication relating to changes in the power consumption of the device. More specifically, the object device specifying unit 28 refers to the transmission source MAC address or destination MAC address of the packet relating to the communication and searches the device information database 29 by means of the MAC address. When the communication is the communication that changes the power consumption of the transmission source, the object device specifying unit refers to the transmission source MAC address, and when the communication is the communication changing the power consumption of the destination, the object device specifying unit refers to the destination MAC address. The object device specifying unit 28 also acquires the device ID of the device relating to the communication from the retrieved record. The processing then advances to step S206.

In step S206, the socket in which the power consumption has changed in a period of time relating to communication is specified on the basis of power consumption information. The socket specifying unit 27 specifies the socket for which the power consumption has been observed to change correspondingly to the contents of communication within a period in which the communication specified in step S204 has been performed by comparing the power consumption acquired in step S203 in a time sequence for each socket. Thus, when the communication specified in step S204 is the communication suggesting the increase in power consumption of the device relating to the communication, a socket in which the power consumption has been increased is specified. Meanwhile, when the communication specified in step S204 is the communication suggesting the decrease in power consumption of the device relating to the communication, a socket in which the power consumption has been decreased is specified.

In the case where no socket has been specified, the processing advances to step S202. Thus, in the processing illustrated by the present flowchart, the processing of steps S202 to S206 is repeated till the socket corresponding to the device relating to the device ID acquired in step S205 is specified. Meanwhile, the socket is specified, the processing advances to step S207.

In step S207, the socket and electrical outlet are associated with the device. The association unit 24 associates the electrical outlet ID and socket ID of the socket specified in step S206 with the device ID acquired in step S205. The details of the processing are same as those of the processing explained in step S109 illustrated by FIG. 5 and the explanation thereof is therefore omitted. Then, the processing advances to step S201. Thus, in the processing illustrated by the present flowchart, the processing of steps S201 to S207 is repeated till the association with the sockets is completed for the entire device stored in the device information database 29.

The periodic acquisition of power consumption indicated in step S202 and the specification of the object device indicated in steps S203 to S205 may be performed in a sequence other than that shown in FIG. 6. The specification of the object device may be performed in advance, and the periodic acquisition of power consumption and the specification of the object device may be performed in parallel at the same time.

Figure 7:
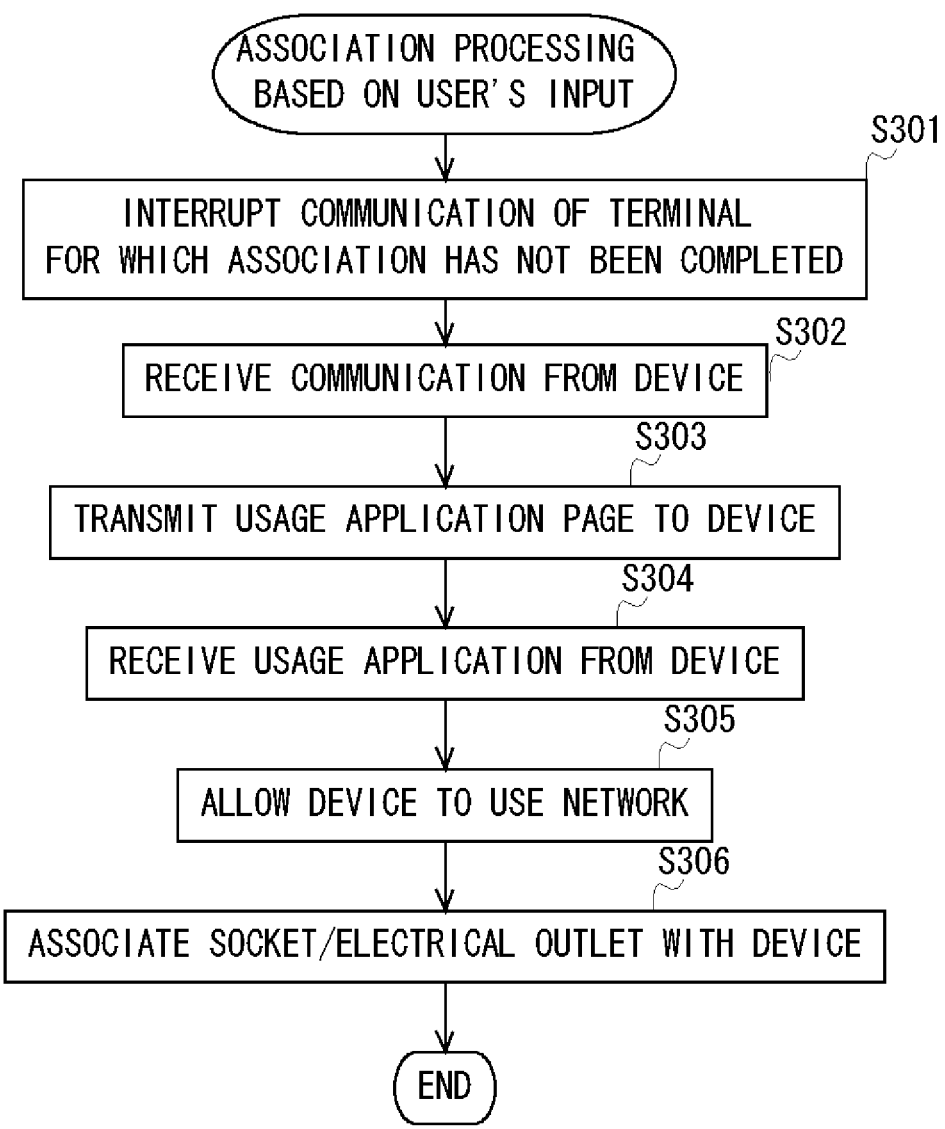
FIG. 7 is a flowchart illustrating the flow of association processing based on user's input according to the embodiment.

FIG. 7 is a flowchart illustrating the flow of association processing based on the user's input according to the present embodiment. The present flowchart serves to explain in greater detail the association processing illustrated by FIG. 4. The processing illustrated by the present flowchart serves to cause the user to input the correspondence relationship between the electrical outlet apparatus 80, socket, and the processing and may be executed to allow the user to confirm and correct, as necessary, the results of the association processing shown in FIG. 5 and FIG. 6.

In step S301, communication by the terminal for which the usage application for the network 2 has not been completed is interrupted. When there is a terminal for which the device 90 detected in the device management processing illustrated by FIG. 4 has not completed the usage application for the network 2, the network control unit 30 of the device management server 20 performs the ARP spoofing by notifying the device 90 of the own (device management server 20) MAC address (also referred to hereinbelow as "spoofing address") as a MAC address of another terminal or route (not shown in the figure) in the network 2 (step S301).

For example, the device 90 added to the network 2 broadcast transmits an address resolution request in ARP in order to perform communication with the desired other terminal. In this case, where a typical network is used, the other terminal notifies the device 90 of the own MAC address. However, in the network configuration according to the present embodiment, the device management server 20 is connected to the network 2, and the network control unit 30 of the device management server 20 notifies the device 90 of the own (device management server 20) MAC address (spoofing address) in response to the address resolution request from the device 90.

The notification of the spoofing address from the network control unit 30 of the device management server 20 to the device 90 may be transmitted as an ARP request from the device management server 20, rather than the response to the address resolution request transmitted from the device 90.

In any case, the MAC address notified to the device 90 is obtained by disguising the MAC address of the default router or other terminal in the network 2 with the MAC address of the device management server 20. Therefore, with the device management server 20 according to the present embodiment, the device 90 without a usage application registers in the address list the MAC address of the device management server 20 as the MAC address of a terminal outside the network 2 or another terminal in the network 2.

Therefore, when the device 90 without a usage application attempts to access a terminal outside the network 2 or another terminal in the network 2, a packet is transmitted to a MAC address disguised by the network control unit 30 of the device management server 20. In other words, the network control unit 30 introduces the information transmitted from the device 90 to the device management server 20 by notifying the device 90 of the MAC address of the device management server 20 as the MAC address of another device.

Further, the network control unit 30 of the device management server 20 destroys (does not transfer) the entire packet transmitted from the device 90 for which a usage application has not been completed, or destroys part of this packet, except for the communication necessary for the below-described usage application. With the method such as described hereinabove, the network control unit 30 of the device management server 20 interrupts the entire communication performed by the device 90 for which a usage application has not been completed, or part of this communication.

It is preferred that the network control unit 30 transmit an ARP request for spoofing a plurality of times with intervals for preventing the address list held by the device 90 for which a usage application has not been completed from holding the correct MAC address of the communication partner. The processing the advances to step S302.

In step S302 and step S303, a usage application page is transmitted to the device 90. The communication unit 26 of the device management server 20 receives the communication from the device 90 (step S302). When the received communication is the HTTP communication, the communication unit 26 transmits a Web page for a usage application to the device 90, regardless of the communication partner designated in the HTTP connection request (step S303). The device 90 that has received the Web page for a usage application displays the Web page for a usage application. In the usage application system 1 according to the present embodiment, the Web page for a usage application includes an input field for inputting information for a usage application (for example, the user ID or password) for applying for use of the network 2 by the user of the device 90 or the device 90. However, depending on the embodiment, another usage application method may be also used.

When the communication acquired from the device 90 for which the communication is being interrupted is the HTTP communication, the network control unit 30 of the device management server 20 may be redirected so as to be connected to a usage application server (not shown in the figure) that has been provided separately from the device management server 20. Where a redirect request is received, the device 90 is connected to a predetermined usage application server that has been notified from the device management server 20. In this case, the MAC address of the device management server 20 is set at the destination MAC address of the packet that is transmitted from the device 90, but a packet for which the destination IP address is the usage application server is transferred without interruption (packet is rejected) by the device management server 20. Then, within a period before the usage application of the device 90 is completed, the device management server 20 transfers the packet for which the destination IP address is the usage application server and rejects other packages (communication interruption), without transferring. With such a processing, the device 90 can receive the user application service from the usage application server, while ensuring the security of the network 2. The necessity of packet transfer can be determined by referring to the destination IP address, but other methods may be also used. For example, the necessity of transfer may be also determined by referring to the type of communication protocol, port number, URL, and the like, in addition to the destination IP address.

Further, in the present embodiment, the Web page for a usage application includes an input field for inputting information (in the present embodiment the electrical outlet ID and socket ID) that can specify the electrical outlet apparatus 80 and socket used by the device 90. The user performs a usage application by inputting the information for a usage application by using an input device (keyboard, mouse, or the like) of the device 90. In this case, the electrical outlet ID and socket ID that have been associated in advance by the association processing illustrated by FIG. 5 and FIG. 6 may be inputted to the input field. The results of association performed by the association processing illustrated by FIG. 5 and FIG. 6 can thus be confirmed for the user, and when an error occurs, the user can be allowed to correct the error.

It is preferred that the Web page for a usage application also include an indication of the location in the electrical outlet apparatus 80 where the information that can specify the electrical outlet apparatus 80 and socket is described. By following this indication, the user can look at the predetermined location at the electrical outlet apparatus 80 that has been designated by the indication, obtain the electrical outlet ID and socket ID, and input them into the input field. Where the usage application page is transmitted to the device 90, the processing advances to step S304.

In step S304, the usage application is received from the device 90 and processed. The device 90 transmits the usage application including the information (e.g., user ID or password) for usage application that has been inputted by the user to the device management server 20. The usage application processing unit 31 of the device management server 20 that has received the usage application processes the usage application for the network 2 performed by the user or the device 90 by comparing, for example, the user ID or password included in the received information with the user information that has been stored in advance (step S304). The processing then advances to step S305.

In step S305, the device 90 is allowed to use the network 2. Where the usage application is processed and the use of the network 2 is approved for the device that has performed a usage application, the network control unit 30 of the device management server 20 allows the device to use the network 2 by canceling the communication interruption that used ARP spoofing with respect to the device relating to the device ID that relates to the usage application (step S305). The communication interruption using the ARP spoofing can be canceled by a method of sending the MAC address of the correct partner terminal of the communication to the device 90 or by a method of transferring a packet introduced into the device management server 20 by the ARP spoofing to the partner terminal of the communication. The processing then advances to step S306.

In step S306, the socket and electrical outlet are associated with the device. The usage application transmitted by the device 90 and received in step S304 can include the electrical outlet ID and socket ID inputted by the user. The association unit 24 associates the electrical outlet ID and socket ID contained in the usage application received in step S304 with the device ID of the device 90, which is the transmission source of the usage application. More specifically, the association unit 24 associates the object device with the electrical outlet apparatus 80 and socket by recording the electrical outlet ID and socket ID of the corresponding socket in a record of each piece of device in the device information database 29. The processing indicated in the present flowchart is then ended.

<Effect>

With the device management system 1 described in the present embodiment, the device management server 20 that can detect the device connected to the network 2, acquire information on the detected device, and perform uniform management of the detected device can correctly determine the power consumption of each uniquely specified piece of device by acquiring information on the power consumption via the network 2 from the electrical outlet apparatus 80, which makes it possible to measure the power consumption for each socket, and associating those two types of information.

<Variation Example>

A variation of the device management system will be described below.

Figure 8:
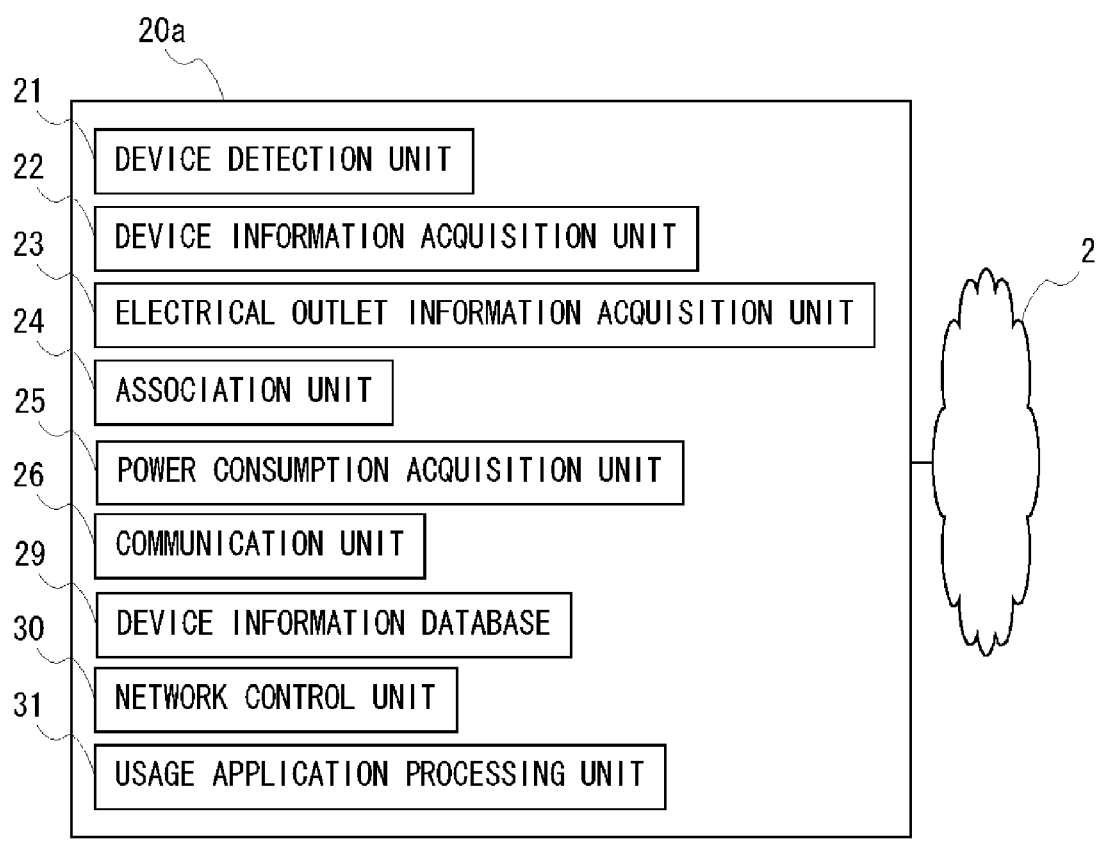
FIG. 8 illustrates a variation of the functional configuration of the device management server according to the embodiment.

FIG. 8 is a variation of the functional configuration of a device management server that may be used when carrying out the present disclosure. The association processing explained with reference to FIG. 7 may be executed by a device management server 20a that does not perform the association processing illustrated by FIG. 5 and FIG. 6. In this case, the functional units (more specifically the socket specifying unit 27 and the object device specifying unit 28) that are necessary only for the association processing illustrated by FIG. 5 and FIG. 6 can be omitted in the device management server 20a. Since the specific functions of each functional unit are same as those of the functional units of the device management server 20 explained in the above-described embodiments, they are assigned with same reference numerals and explanation thereof is herein omitted.

Figure 9:
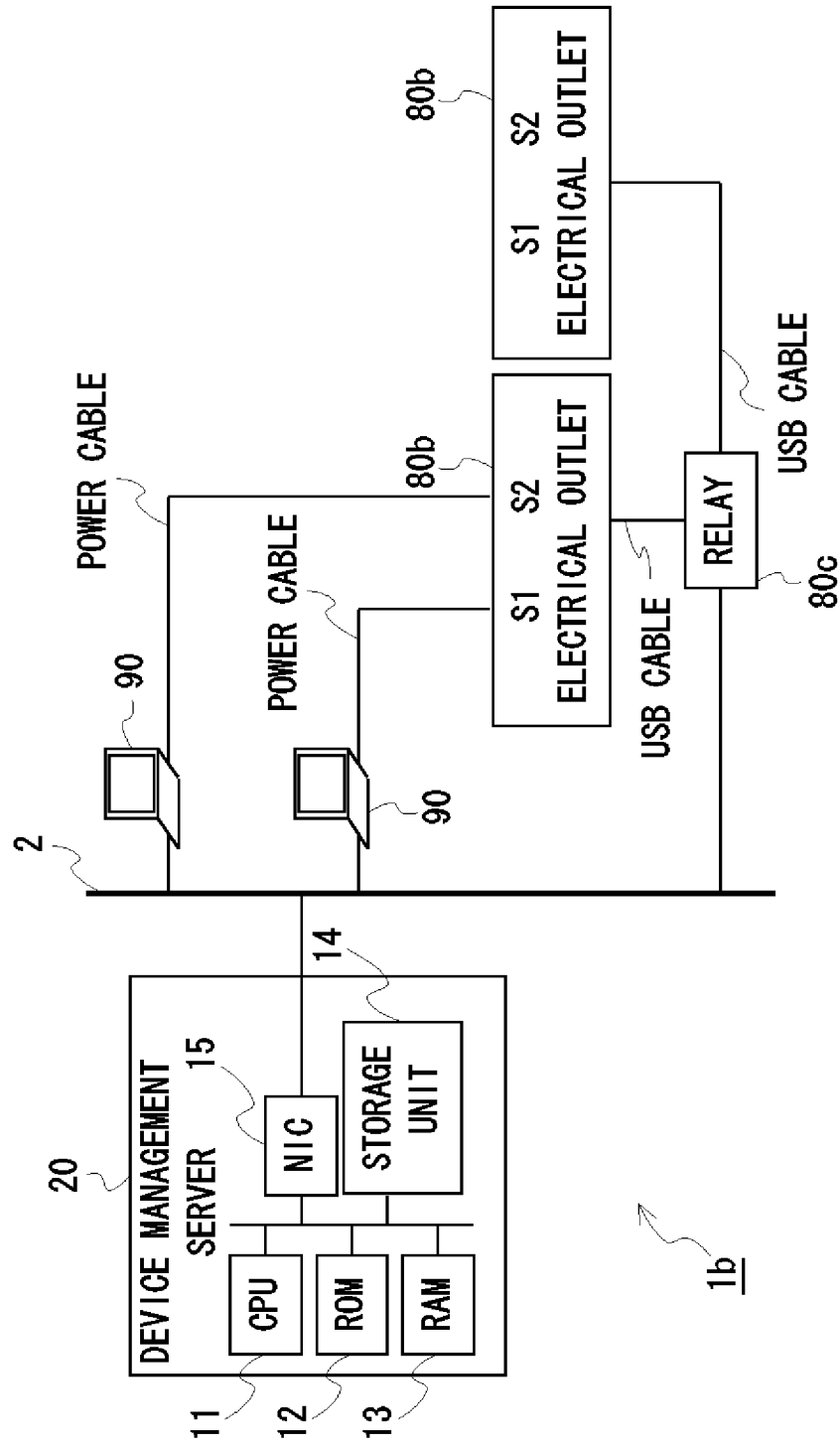
FIG. 9 illustrates a variation of the device management system.

FIG. 9 illustrates a variation of the device management system that may be used when carrying out the present disclosure. In a device management system 1b illustrated by FIG. 9, components same as those in the above-described embodiment are assigned with same reference numerals and explanation thereof is herein omitted. In the example illustrated by FIG. 9, an electrical outlet 80b is provided with a plurality of sockets S1 to Sn that supplies power to the plugged-in device and a power consumption measurement unit 81 that measures the amount of power supplied from the sockets. The electrical outlet 80b is connected to a relay 80c by an interface such as USB (Universal Serial Bus). The relay 80c has functions corresponding to those of the network communication unit 82 of the electrical outlet apparatus 80 explained in the above-described embodiment. Thus, the relay 80c acquires, via the interface such as USB, the power consumption of each socket measured by the power consumption measurement unit 81 of the electrical outlet 80b and transmits the acquired power consumption to the network 2. The relay 80c can also acquire power consumption from a plurality of electrical outlets and transmit the acquired power consumption to the network 2.

In the association processing explained with reference to FIG. 5 to FIG. 7, the association is performed by recording the electrical outlet ID and socket ID in the device information database 29, but the association may be also performed by another method. For example, it is possible to prepare another database (electrical outlet information database or the like) for accumulating the combinations of electrical outlet ID and socket ID with the device ID, and accumulating the combinations of electrical outlet ID and socket ID with the device ID therein.

The present disclosure can be also comprehended as a method or a program executed by a computer. In accordance with the present disclosure, such a program may be recorded on a recording medium readable by a computer or another apparatus, mechanism, or the like. In this case, the recording medium readable by a computer or the like is a recording medium on which information such as data and program can be stored by electrical, magnetic, optical, and mechanical action and can be read from a computer or the like.

What is claimed is:

1. A device management apparatus comprising:
a power consumption acquisition unit for acquiring information relating to power consumption of each of a plurality of sockets;
a communication unit for performing communication with an object device from among devices connected to a network in order to change power consumption of the object device, the object device is an object for associating with the socket which is to supply power to the object device;
a socket specifying unit for specifying a socket in which power consumption has changed within a period of time relating to the communication on the basis of information acquired by the power consumption acquisition unit; and
an association unit for associating the object device with the socket specified by the socket specifying unit,
wherein the communication unit performs communication for applying a load to the object device as communication for changing power consumption of the object device.

2. The device management apparatus according to claim 1, wherein the communication unit performs, as the communication for changing power consumption of the object device, communication for instructing a linkage function that has been installed in advance in the object device and changes the power consumption of the object device upon reception of the communication.

3. A device management apparatus comprising:
a power consumption acquisition unit for acquiring information relating to power consumption of each of a plurality of sockets;
an object device specifying unit for specifying an object device that performs communication accompanied by a change in power consumption by acquiring communication performed by a device connected to a network, the object device is an object for associating with the socket which is to supply power to the object device;
a socket specifying unit for specifying a socket in which power consumption has changed within a period of time relating to the communication on the basis of information acquired by the power consumption acquisition unit; and
an association unit for associating the object device with the socket specified by the socket specifying unit,
wherein the object device specifying unit specifies the object device that performs communication for applying a load to the object device as communication accompanied by a change in power consumption.

4. The device management apparatus according to claim 3, wherein the object device specifying unit acquires communication for a printing instruction to a printer as communication for specifying the object device.

5. The device management apparatus according to claim 3, wherein the object device specifying unit acquires communication generated when a device is connected to the network as communication for specifying the object device.

6. A computer-readable non-transitory recording medium having stored therein a device management program for causing a computer to execute:
acquiring information relating to power consumption of each of a plurality of sockets;
performing communication with an object device from among devices connected to a network in order to change power consumption of the object device, the object device is an object for associating with the socket which is to supply power to the object device;
specifying a socket in which power consumption has changed within a period of time relating to the communication on the basis of information acquired by the power consumption acquisition; and
associating the object device with the socket specified by the socket specifying,
wherein the performing communication involves performing communication for applying a load to the object device as communication for changing power consumption of the object device.

7. A computer-readable non-transitory recording medium having stored therein a device management program for causing a computer to function as:
acquiring information relating to power consumption of each of a plurality of sockets;
specifying an object device that performs communication accompanied by a change in power consumption by acquiring communication performed by a device connected to a network, the object device is an object for associating with the socket which is to supply power to the object device;
specifying a socket in which power consumption has changed within a period of time relating to the communication on the basis of information acquired by the power consumption acquisition; and
associating the object device with the socket specified by the socket specifying,
wherein the specifying involves specifying the object device that performs communication for applying a load to the object device as communication accompanied by a change in power consumption.

* * * * *